(No Model.)
A. T. BEMIS.
SYSTEM OF PIPES FOR HEATING LUMBER KILNS.
No. 475,480. Patented May 24, 1892.
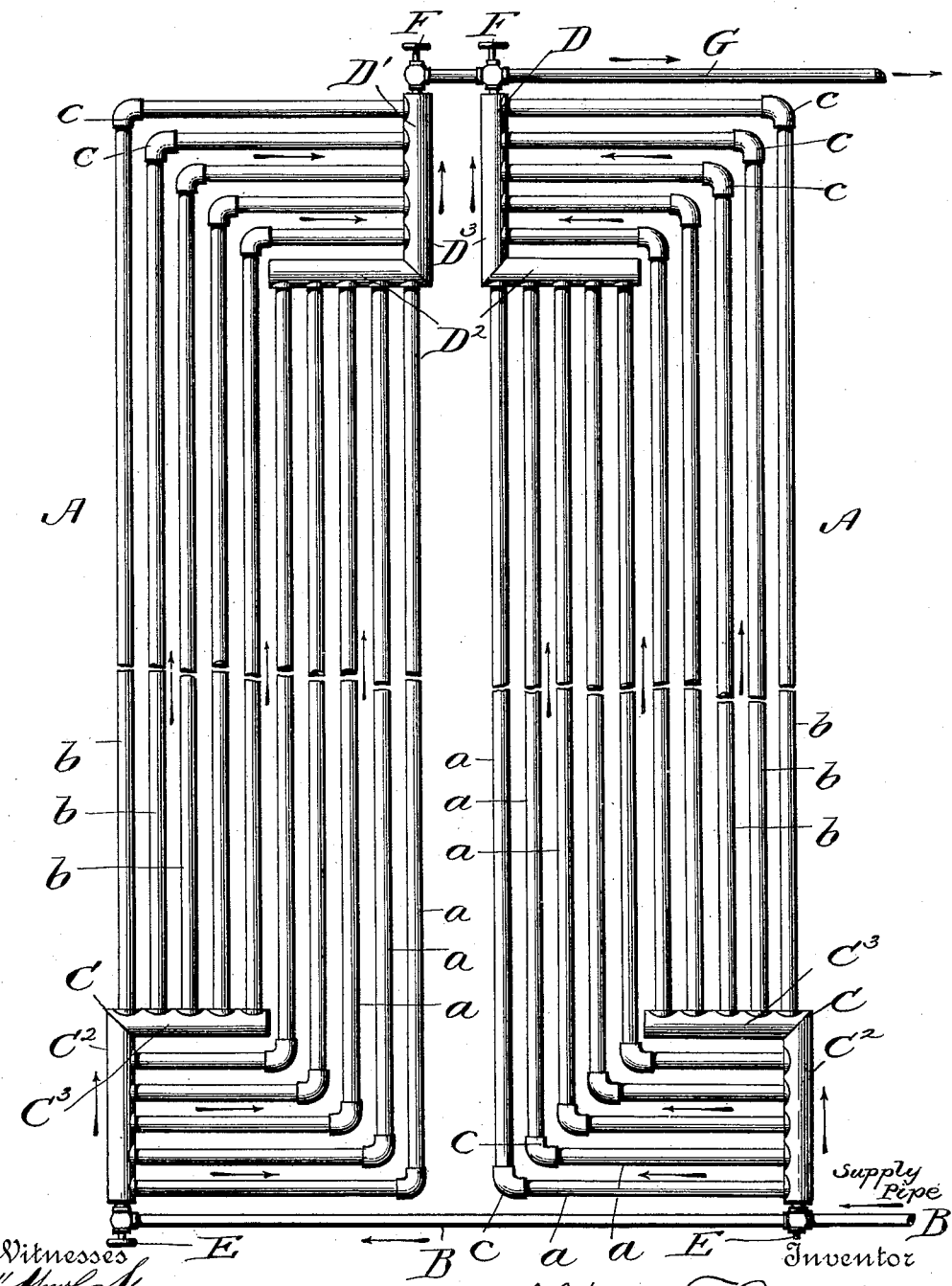
Witnesses
Inventor
Albert T. Bemis
By his Attorney
Franklin H. Hough

UNITED STATES PATENT OFFICE.

ALBERT T. BEMIS, OF LOUISVILLE, KENTUCKY.

SYSTEM OF PIPES FOR HEATING LUMBER-KILNS.

SPECIFICATION forming part of Letters Patent No. 475,480, dated May 24, 1892.

Application filed August 31, 1891. Serial No. 404,324. (No model.)

*To all whom it may concern:*

Be it known that I, ALBERT T. BEMIS, a citizen of the United States, residing at Louisville, in the county of Jefferson and State of Kentucky, have invented certain new and useful Improvements in Systems of Pipes for Heating Lumber-Kilns, &c.; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in systems of steam-pipes for use in heating kilns for drying lumber, brick, and other substances.

In equipping lumber-kilns of large area with systems of pipes for the purpose of supplying the drying-chamber with heat the use of very long pipes is necessitated, and as the pipes are sometimes subjected to sudden variations in temperature provision is required whereby the expansion and contraction of the pipes may be compensated without injury to the joints or disarrangement of the system. This result has been in a measure overcome heretofore by the use of what has been termed "expansion-joints;" but the use of such joints has been attended with considerable expense, and for other reasons the use of this form of joint has not been found to be desirable in so extensive a system of heating-pipes as is required in lumber-kilns.

The object of the present invention is to provide a pipe system or arrangement of heating-pipes especially adapted for use in heating lumber-kilns, in which system the pipes will be so arranged as to provide at once for a uniform distribution of heat or steam throughout the system and in which adequate provision is had for expansion and contraction of the pipes due to the changes in temperature without the use of compensating-joints.

To the above ends and to such others as the invention may pertain the same consists in the peculiar arrangement and in the novel combination and adaptation of parts, all as more fully hereinafter described, shown in the accompanying drawing, and then specifically defined in the appended claim.

The invention is fully illustrated in the accompanying drawing, in which I have shown a top plan view of a system of heating-pipes arranged in accordance with my invention.

Reference now being had to the details of the drawing by letter, B represents the inlet or supply pipe, which leads from any suitable source of heat or steam supply. (Not shown.)

C is a pipe bent to a right angle, known as a "manifold." The supply-pipe B communicates with one end of the said manifold, as shown, the valve E serving to regulate the supply of heat or steam, as required. The pipes $a$ $a$ receive their supply of heat or steam from the portion $C^2$ of the manifold, and from the points at which said pipes are connected with the manifold they are extended for a short distance in a direction at right angles thereto, where they are again bent at right angles and extended to a point near the opposite end of the kiln, where they enter the portion $D^2$ of the manifold D. The pipes $b$ $b$ connect at one end with the portion $C^3$ of the manifold and extend in direct parallel lines to the opposite end of the kiln, where they are bent at right angles, as shown, and their opposite ends connected directly with the portion $D^3$ of the manifold D. The exhaust steam or air passes from the end of the manifold D through the valve F into the exhaust-pipe G.

While in the drawing I have shown but two of these systems, both having common supply and exhaust pipes, it is at once evident that any desired number may be employed, and that the number and arrangement of the pipes may be varied without departing from the spirit of my invention.

When it is considered that the length of the pipes $a$ $a$ is great, it will be seen that the arrangement described will provide ample opportunity for expansion and contraction by reason of the angles $c$ $c$, which will spring sufficiently to compensate for the expansion without injury to either the pipe or joint.

It is my purpose to arrange the system of pipes above the floor of the drying-chamber of the kiln, where they will at all times be accessible in case repairs are required.

The floor of the kiln being laid upon an incline and the pipes being placed upon the level of the floor, a perfect drainage of the pipes is assured.

My specific arrangement of pipes or tubes with couplings $c$ permits of the employment of short lengths of tubes, and at the same time provides for ready repairs, more so than where long tubes are bent at the angle.

Having thus described my invention, what I claim to be new, and desire to secure by Letters Patent, is—

The combination, with the manifolds C and D, consisting of the body portions $C^2$ and $D^3$ and the arms $C^3$ and $D^2$, arranged at right angles to the body portions, of the short and long pipes $a$, having portions at right angles to other portions and connected by elbow-couplings arranged in the same horizontal plane with the manifolds and connecting the body portion $C^2$ of the manifold C with the arm $D^2$ of the manifold D, the pipes $b$, connecting the arm $C^3$ of the manifold C with the body portion $D^3$ of the manifold D, and the supply and exhaust pipes B and G, the manifolds at one end being arranged adjacent to each other in the center and the other manifolds arranged upon the outside, all arranged substantially as and for the purpose described.

In testimony whereof I affix my signature in presence of two witnesses.

ALBERT T. BEMIS.

Witnesses:
FRANKLIN H. HOUGH,
R. S. DONALDSON.